United States Patent
Watnik et al.

(10) Patent No.: US 10,557,923 B2
(45) Date of Patent: Feb. 11, 2020

(54) REAL-TIME PROCESSING AND ADAPTABLE ILLUMINATION LIDAR CAMERA USING A SPATIAL LIGHT MODULATOR

(71) Applicant: GOVERNMENT OF THE UNITED STATES OF AMERICA, AS REPRESENTED BY THE SECRETARY OF THE NAVY, Arlington, VA (US)

(72) Inventors: Abbie T. Watnik, Washington, DC (US); Paul S. Lebow, Annapolis, MD (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 741 days.

(21) Appl. No.: 15/049,401

(22) Filed: Feb. 22, 2016

(65) Prior Publication Data
US 2016/0245902 A1    Aug. 25, 2016

Related U.S. Application Data

(60) Provisional application No. 62/120,413, filed on Feb. 25, 2015.

(51) Int. Cl.
*G01C 3/08*     (2006.01)
*G01S 7/481*    (2006.01)
*G01S 7/484*    (2006.01)
*G01S 17/89*    (2006.01)

(52) U.S. Cl.
CPC ............ *G01S 7/4815* (2013.01); *G01S 7/484* (2013.01); *G01S 17/89* (2013.01)

(58) Field of Classification Search
CPC ............ G01S 7/4815; G01S 7/484; G01S 7/89
See application file for complete search history.

(56) References Cited

U.S. PATENT DOCUMENTS

| | | | | |
|---|---|---|---|---|
| 6,088,488 A | * | 7/2000 | Hardy | G06T 5/50 382/130 |
| 6,804,403 B1 | * | 10/2004 | Wang | H04N 19/63 375/E7.04 |
| 8,736,818 B2 | | 5/2014 | Weimer et al. | |
| 8,829,417 B2 | | 9/2014 | Krill et al. | |
| 2003/0071119 A1 | * | 4/2003 | Tsikos | G02B 26/10 235/434 |
| 2003/0156307 A1 | * | 8/2003 | Schuck | G02B 5/32 359/21 |

(Continued)

*Primary Examiner* — Samantha K Abraham
(74) *Attorney, Agent, or Firm* — US Naval Research Laboratory; Suresh Koshy

(57) ABSTRACT

An apparatus for illuminating or masking an object and a method of using same. The apparatus includes a spatial light modulator transmitting, a structured pulsed laser beam from a pupil plane to at least one image plane in a field of view. The apparatus further includes a lidar detector receiving reflected laser beam reflected from the at least one image plane. For example, the lidar detector detects range, position, and/or time data for at least one object of interest or at least one object of disinterest. Using the detected data, the spatial light modulator illuminates object of interest or masks an object of disinterest, depending on a user's application.

21 Claims, 6 Drawing Sheets

(56) References Cited

U.S. PATENT DOCUMENTS

| | | | |
|---|---|---|---|
| 2005/0174621 A1* | 8/2005 | Edwards | G03H 1/04 |
| | | | 359/32 |
| 2006/0227440 A1* | 10/2006 | Gluckstad | G02B 27/09 |
| | | | 359/885 |
| 2012/0050832 A1* | 3/2012 | Rosen | G03H 1/0443 |
| | | | 359/25 |
| 2015/0139560 A1* | 5/2015 | DeWeert | H04N 19/44 |
| | | | 382/233 |
| 2015/0286340 A1* | 10/2015 | Send | G01S 17/46 |
| | | | 345/175 |

\* cited by examiner

REAL-TIME PROCESSING AND ADAPTABLE ILLUMINATION LIDAR CAMERA USING A SPATIAL LIGHT MODULATOR

CROSS-REFERENCE TO RELATED APPLICATIONS

This application claims priority to U.S. Provisional Patent Application Ser. No. 62/420,413, entitled "REAL-TIME PROCESSING AND ADAPTABLE ILLUMINATION LIDAR CAMERA USING A SPATIAL LIGHT MODULATOR," to Watnik et al., which was filed on 25 Feb. 2015 and is incorporated herein by reference.

BACKGROUND OF TIME INVENTION

Field of the Invention

This invention relates in general to a method and apparatus for masking illumination of an undesirable feature in a field of view and/or for selectively illuminating a target of interest in a field of view, and in particular to a method and apparatus for masking an undesirable feature in a field of view and/or for illuminating a target of interest in a field of view using a lidar camera and a spatial light modulator.

Description of the Related Art

Active imaging systems, such as a lidar system, contain an illumination source as well as an imaging detector. The laser illumination source is a major contributor to the size, weight and power of the overall system. In order to maximize the efficiency of the system, the illumination of the scene must be optimized to avoid wasting laser power.

Illumination control for lidar systems has been implemented in a variety of ways, from reshaping beam profiles from Gaussian to top hat with conventional optics, reshaping from Gaussian to an array of beamlets using a diffractive optical element, and reshaping to arbitrary patterns using an acoustic-optic modulator.

BRIEF SUMMARY OF THE INVENTION

According to an embodiment of the invention, a lidar camera presented below enables specific illumination of targets and/or specific voids in the imaging scene. The processing to acquire a lidar image and re-illuminate specific regions integral to the imaging system is also disclosed.

An embodiment of the invention has application in areas such as foliage penetration, cloud avoidance, and/or bathymetry lidar. In lidar vegetation mapping, the heights and surfaces of the foliage are desired; however, some applications desire to maximize the light through the foliage, to the ground targets below. This approach enables concentrating the laser illumination power between the leaves of the foliage, such that the majority of light reaches the ground level.

Alternatively, an embodiment of the invention masks out areas of intermediate clouds, thus reducing the noise caused by these scattering returns and redirecting the light to areas in the scene of interest. Alternatively, in an embodiment of the invention used for bathymetry applications, reflections from the water surface often cause high intensity glints within the image scene, saturating the camera. By masking out these regions, no laser light is directed to these regions of the scene, improving collection from other non-masked parts of the field-of-view.

In addition to increasing laser power to specific areas of the scene to aid in the increased signal return from those regions, directed laser power is optionally used as an active warning signal to people and/or objects within the scene. Re-illuminating the scene at directed targets at a wavelength sensitive to detection by a person and/or object in the scene may alert them that their presence is being monitored. For example, such an alert would indicate to the targets that their presence was being monitored by unfriendly parties and as such their safety was possibly at risk. The initial illumination beam used to detect the lidar returns is optionally invisible to the targets, while a shaped illumination beam is optionally at a wavelength visible to the targets.

DETAILED DESCRIPTION OF INVENTION

Figure 1:
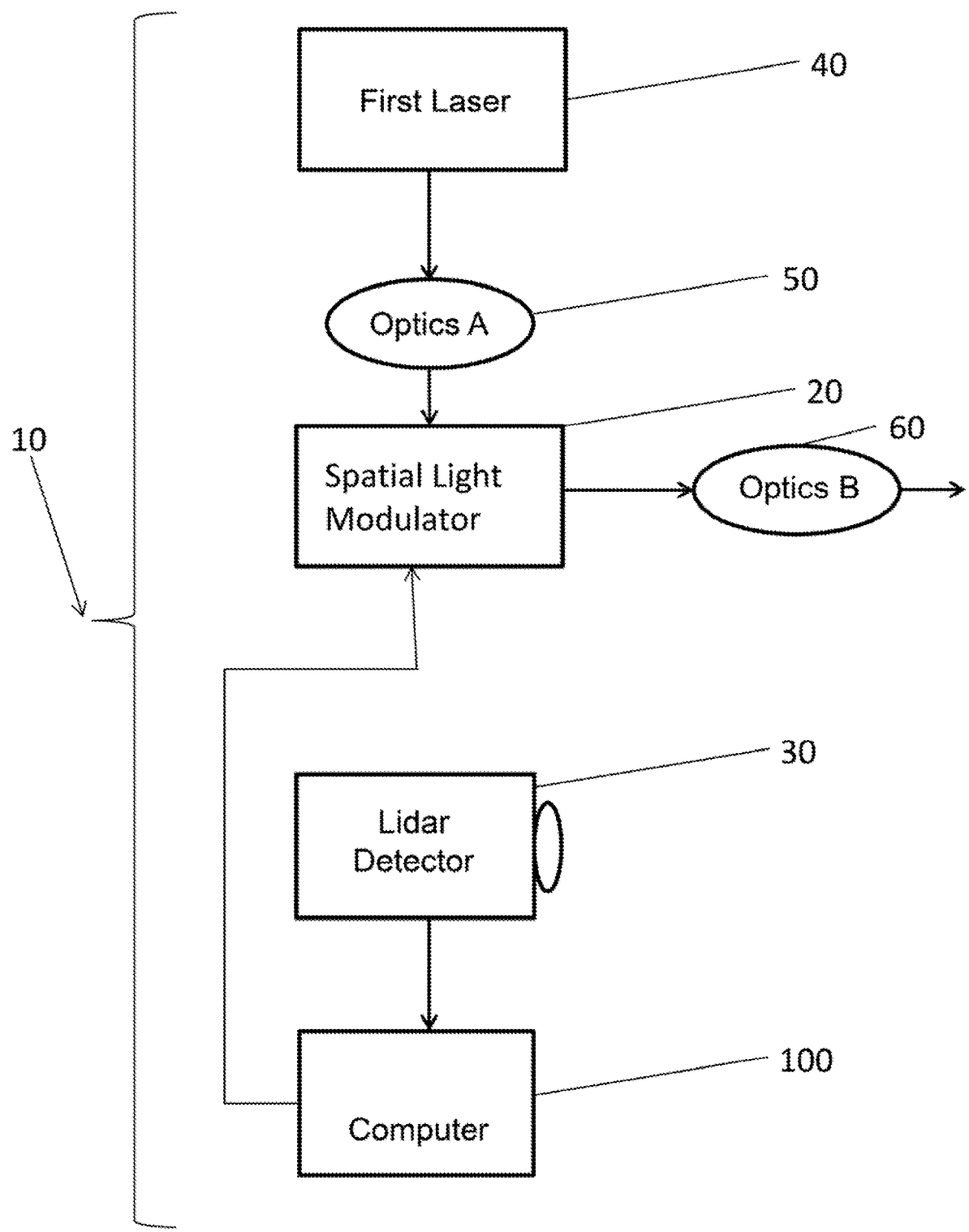
FIG. 1 is an illustrative block diagram of an apparatus embodiment of the instant invention.
Figure 2:
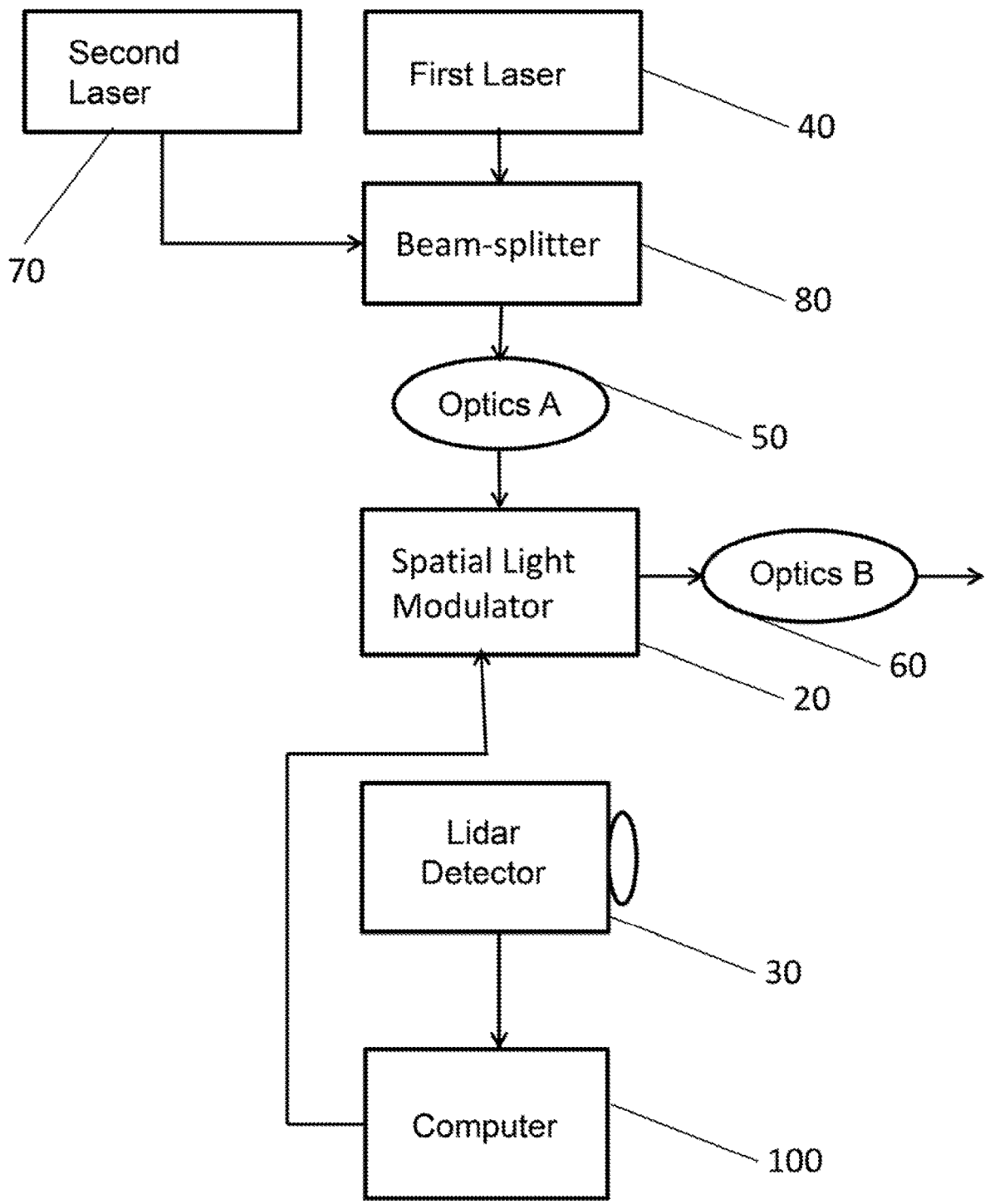
FIG. 2 is an illustrative block diagram of another apparatus embodiment of the instant invention.
Figure 3:
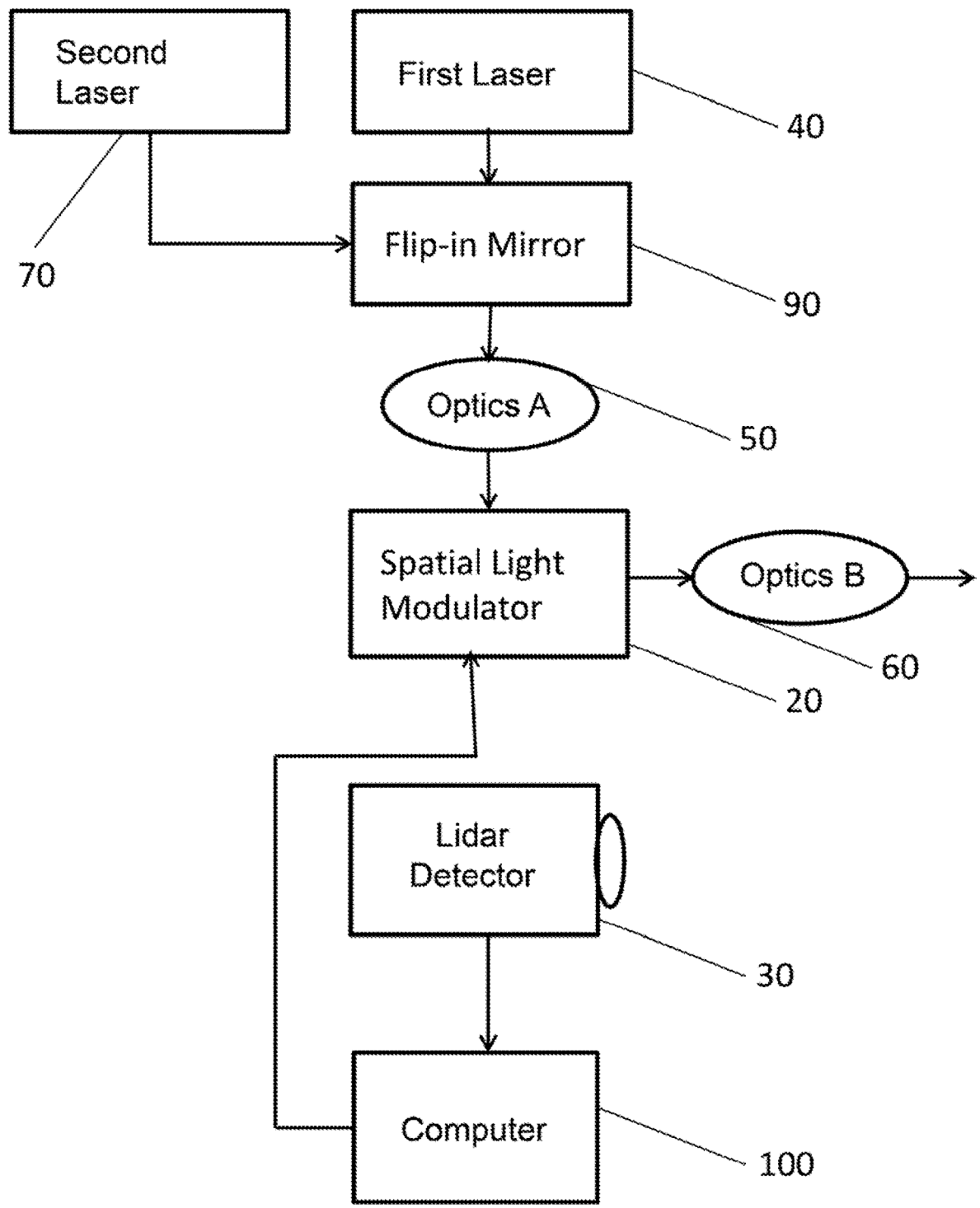
FIG. 3 is an illustrative block diagram of another apparatus embodiment of the instant invention.

An embodiment of the invention includes an illumination and imaging apparatus 10, for example, as shown by way of illustration in FIGS. 1-3. The apparatus 10 includes a standard spatial light modulator 20 transmitting a structured laser beam from a pupil plane to at least one image plane in a field of view. The spatial light modulator 20 includes a standard liquid crystal device, a standard digital mirror device ("DMD"), or a standard magneto-optic device. The spatial light modulator includes a standard phase-only SLM, a standard intensity-only SLM, or a standard phase and intensity SLM. Due to power handling, a DMD is optionally most applicable for long-range applications.

The apparatus 10 also includes a standard lidar detector 30 receiving a reflected laser beam reflected from the at least one image plane. (The acronym lidar (or ladar) stands for light (or laser) detection and ranging. A lidar system measures range and intensity with respect to spatial (x, y, z) position. In other words, for the purpose of this patent application, the terms lidar and ladar are understood to be equivalent). The lidar camera 30 optionally includes a standard flash lidar system or standard scanning lidar system. The primary basis of scene selection for an illumination beam from the spatial light modulator 20 is determined through the intensity and range returns collected on the lidar camera 30. The intensity returns from surface reflections within the scene are detected in different time bins due to the round trip distance/range between the object and the detector.

Optionally, the apparatus 10 further includes a standard first laser 40 transmitting a pulsed first laser beam to the spatial light modulator 20. The pulsed laser beam includes a pulsed laser beam size. The spatial light modulator 20 includes a spatial light modulator size. The apparatus 10 further includes a standard first optical element 50 labeled "Optics A" in FIGS. 1-3 and operably located between the pulsed laser 40 and the spatial light modulator 20. The first optical element 50 expands the pulsed first laser beam size to the spatial light modulator size. One of ordinary skill in the art will readily appreciate that the pulsed first laser beam size need not be expanded to be exactly the same size as the spatial light modulator size. If the expanded pulsed first laser beam size is much smaller than the spatial modulator size, then the full capability of the spatial light modulator is not utilized. If the expanded pulsed first laser beam size is much larger than the spatial modulator size, then more laser power is used than is needed, potentially limiting the duration of a task using an embodiment of the instant invention. The apparatus 10 further includes a standard second optical element 60 labeled "Optics A" in FIGS. 1-3 and operably located between the spatial light modulator 20 and the at least one image plane. The structured laser beam includes a structured laser beam size. The field of view has a field of view size. The second optical element 60 expands the structured laser beam size to the field of view size.

Optionally, at least one image plane includes a plurality of image planes. The plurality of image planes includes respective distances from the lidar detector 30.

Optionally, the spatial light modulator 20 includes a standard intensity spatial light modulator, a standard complex transmittance spatial light modulator, or a standard phase-only spatial light modulator. Optionally, the intensity spatial light modulator includes an intensity hologram. The intensity hologram includes a first encoded magnitude array or a second encoded magnitude array. The first encoded magnitude array is derived from a threshold-image mask, and the second encoded magnitude array is derived from an inverse threshold-image mask. Optionally, the complex transmittance spatial light modulator includes a complex field with magnitude and phase. The complex field with magnitude and phase includes a first encoded magnitude and phase array or a second encoded magnitude and phase array. The first encoded magnitude and phase array is derived from a threshold-image mask, and the second encoded magnitude and phase array is derived from an inverse threshold-image mask. Optionally, the complex transmittance spatial light modulator includes an intensity hologram or a wrapped phase. Optionally, the phase-only spatial light modulator includes as wrapped phase. The wrapped phase includes as first encoded phase array or a second encoded phase array. The first encoded phase array is derived from a threshold-image mask, and the second encoded phase array is derived from a threshold-image inverse mask.

Optionally, the apparatus further includes a standard second laser 70 transmitting an illuminating continuous wave laser beam or an illuminating pulsed laser beam to spatial light modulator 20. Optionally, the apparatus further includes a standard beam splitter 80, such as shown in FIG. 2, or a standard flip-in mirror 90, such as shown in FIG. 3, located optically between the second laser 70 and the spatial light modulator 20.

Another apparatus embodiment of the invention is described as follows with reference to FIGS. 1-3. The apparatus 10 includes a standard first laser 40 (e.g., a pulsed laser) that operates at a wavelength $\lambda_1$. The output from the first laser 40 is directed to a first set of standard optical, elements 50, collectively referenced as "Optics A" in FIGS. 1-3. Optics A 50 expands the beam to match the size of a standard spatial light modulator ("SLM") 20. The SLM 20 is encoded with a phase and/or amplitude to shape the laser beam wavefront. After the SLM 20, the laser beam passes through a second set of standard optical elements 60, collectively referenced as "Optics B" in FIGS. 1-3. Optics B 60 expands the beam to the field-of-view of the apparatus 10. The shaped beam is then transmitted through the atmosphere to a three-dimensional scene. The laser light is reflected off the objects in the scene and propagated back through the atmosphere to be received by a standard lidar detector 30. The lidar detector 30 records the laser returns in different time bins denoting different round trip times of object surface reflections, resulting from different ranges within the scene. The lidar image is processed by a standard computer 100 to determine an updated SLM 20 pattern fear the next laser illumination upon the scene.

Another apparatus embodiment of the invention is described as follows with reference to FIGS. 2-3. In addition to the original configuration and operation, a standard second laser 70 (e.g., a standard pulsed laser or a standard continuous-wave laser) is added to the system 10 operating at wavelength $\lambda_2$. For example, the second laser 70 embodied as a pulsed laser would allow determination of range with the lidar detector. For example, the second laser 70 embodied as a continuo is wave laser would allow spot-lighting of a target, once the range of the target to be illuminated has been determined. A standard dichroic beam-splitter 80 or standard flip-in mirror 90 is located between the first laser 40 and Optics A 50 to provide dual or sequential operation between the two laser sources. The second laser 70, for example, operates as an illuminator, visual warning signal, interrogator, and/or directed energy beam to specific targets within the scene. For example, the first laser 40 operates at short or long wave infrared, which is invisible to the human visual system to detect human beings within the scene, while the second laser 70 operates at visible wavelengths to aid humans in identified targets/objects within the scene, or directly illuminating humans to serve as a visual warning system.

Figure 4:
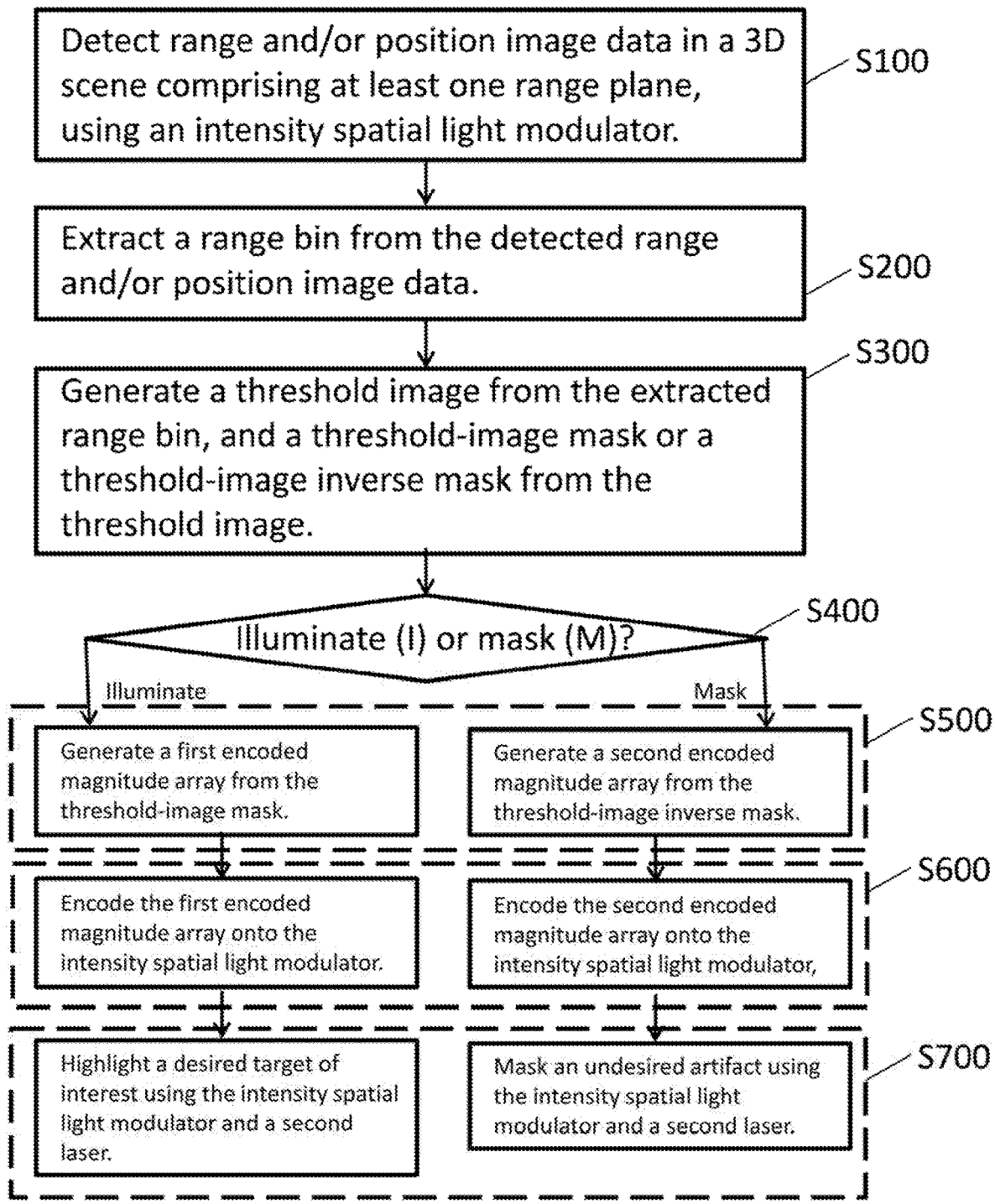
FIG. 4 is an illustrative flowchart of a method embodiment of the instant invention.
Figure 5:
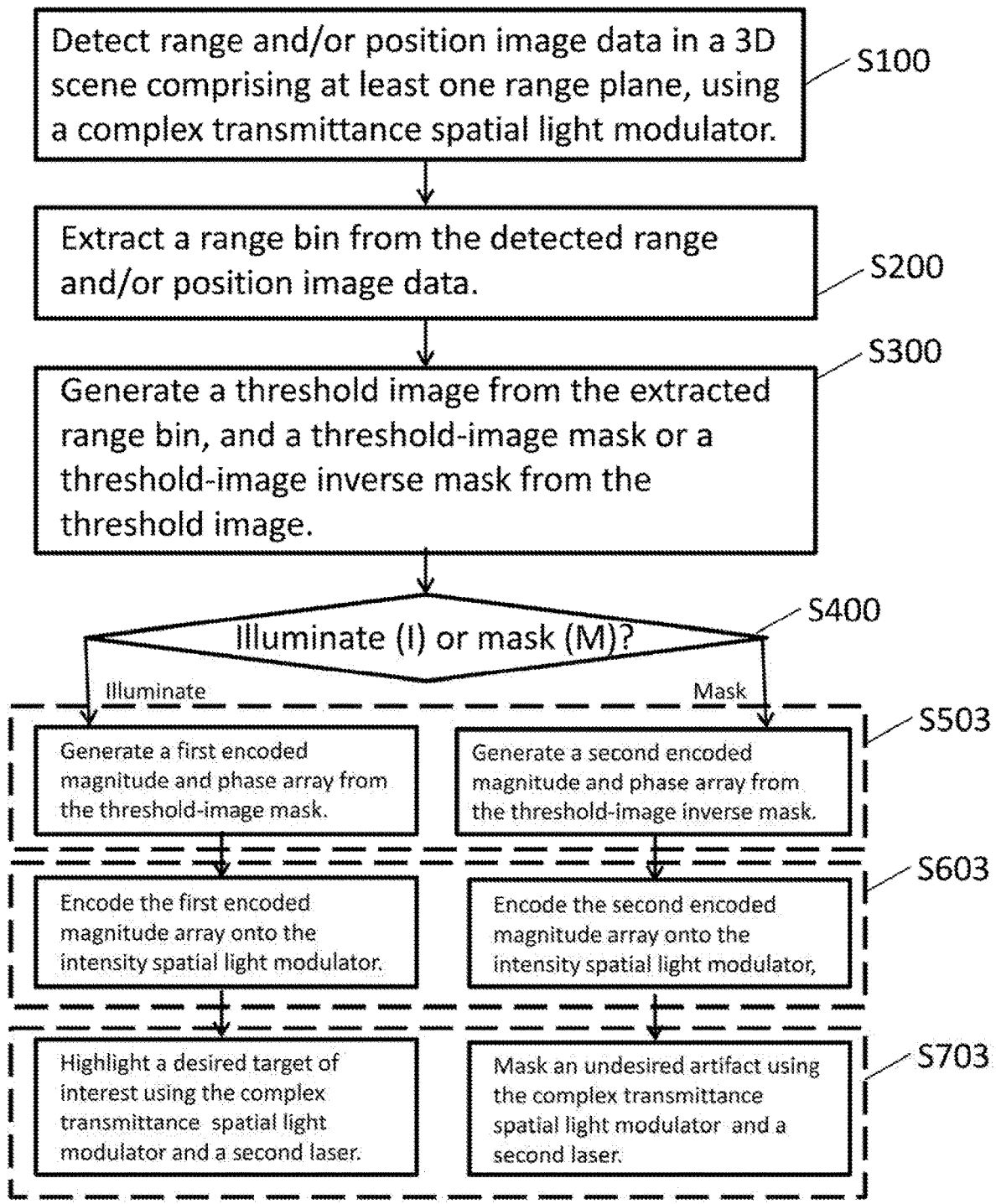
FIG. 5 is an illustrative flowchart of another method embodiment of the instant invention.
Figure 6:
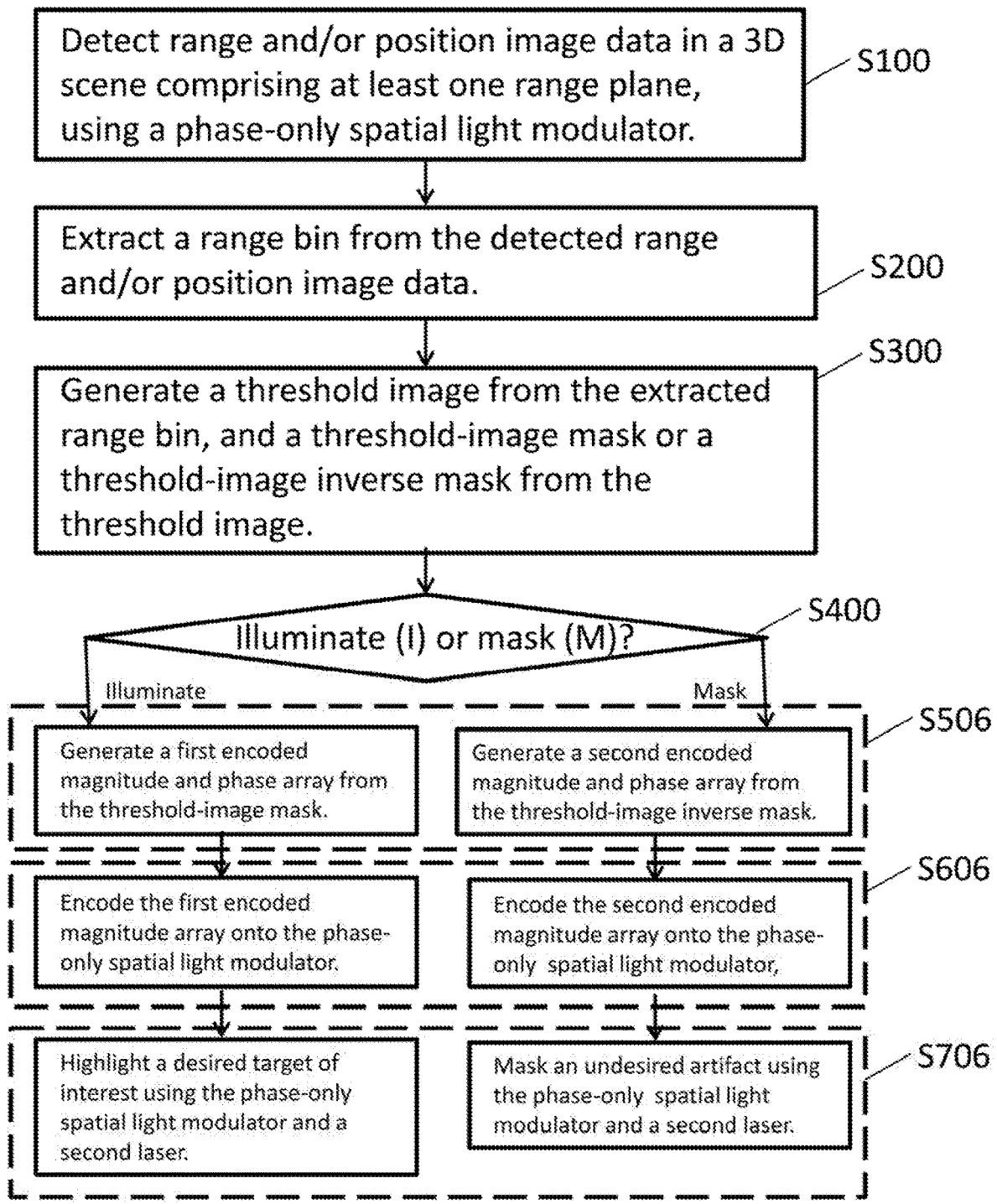
FIG. 6 is an illustrative flowchart of another method embodiment of the instant invention.

Another embodiment of the invention includes a method of using the apparatus described above, and is described below with reference to the illustrative flowcharts in FIGS. 4-6. In Step S100, a structured pulsed laser beam is transmitted using a spatial light modulator 20 from a pupil plane to at least one image plane in a field of view. A reflected laser beam is detected from the field of view using a lidar detector 30.

Optionally, the detection of a reflected laser beam from the field of view using a lidar detector includes detecting range, position, and/or time data for at least one object of interest or at least one object of disinterest, depending on the user's application. An example of an object of interest is a potential target such as a building, a vehicle, an animal, or a person. An example of an object of disinterest is a shiny surface or a shimmering surface that produces glare and hence impedes proper viewing of a potential target, such as clouds, the surface of water, metal, or glass. As another example, the object of disinterest includes a partial obscuration such as a branch or leaf. Optionally, in Step S200, at least one range bin is extracted. The at least one range bin corresponds to the at least one image plane. The at least one image plane contains the detected range, position, and/or time data for the at least one object of interest; or, the at least one image plane contains the detected range, position, and/or time data for the at least one object of disinterest. Optionally, a threshold image is generated from the at least one range bin, and a threshold-image mask or a threshold-image inverse mask is generated from the threshold image, in Step S300.

Optionally, in Step S400, the user decides whether to illuminate a target or mask some undesirable object in the field of view.

Optionally, in Step S500, a first encoded magnitude array is generated from the threshold-image mask, or a second encoded magnitude array is generated from the threshold-image inverse mask. Optionally, in Step S600, the spatial light modulator 20 includes a standard intensity spatial light modulator. The intensity spatial light modulator includes an intensity hologram. The first encoded magnitude array is encoded onto the intensity spatial light modulator, the intensity hologram comprising the first encoded magnitude array; or the second encoded magnitude array is encoded onto the intensity spatial light modulator, the intensity hologram including the second encoded magnitude array. Optionally, in Step S700, at least one object of interest is illuminated for detection by the lidar detector 30 using the intensity spatial light modulator and a second laser 70, the second laser including a continuous wave second laser or a pulsed second laser; or at least one object is of disinterest is masked from detection by the lidar detector using the intensity spatial light modulator and a second laser 70, the second laser including the continuous wave second laser or the pulsed second laser.

Optionally, in Step S503, a first encoded magnitude and phase array is generated from the threshold-image mask; or a second encoded magnitude and phase array is generated from the threshold-image inverse mask. Optionally, in Step S603, the spatial light modulator 20 includes a standard complex transmittance spatial light modulator. The complex transmittance spatial light modulator including a complex field with magnitude and phase. The first encoded magnitude and phase array is encoded onto the complex transmittance spatial light modulator, the complex field with magnitude and phase comprising the first encoded magnitude and phase array; or the second encoded magnitude and phase array is encoded onto the complex transmittance spatial light modulator, the complex field with magnitude and phase including the second encoded magnitude and phase array. Optionally, in Step S703, at least one object of interest is illuminated for detection by the lidar detector 30 using the complex transmittance spatial light modulator and a second laser 70, the second laser including as continuous wave second laser or a pulsed second laser; or at least one object of disinterest is masked from detection by the lidar detector using the complex transmittance spatial light modulator and the second laser, the second laser including a continuous wave second laser or the pulsed second laser.

Optionally, in Step S506, a first encoded phase array is generated from the threshold-image mask, or a second encoded phase array is generated from the threshold-image inverse mask. Optionally, in Step S605, the spatial light modulator 20 includes a standard phase-only spatial light modulator. The phase-only spatial light modulator includes a wrapped phase. Optionally, the first encoded phase array is encoded onto the phase-only spatial light modulator, the wrapped phase including the tint encoded phase array; or the second encoded phase array is encoded onto the phase-only spatial light modulator, the wrapped phase including the second encoded phase array. Optionally, in Step S706, at least one object of interest is illuminated for detection by the lidar detector 30 using the phase-only spatial light modulator and a second laser 70, the second laser including a continuous wave second laser or a pulsed second laser; or at least one object of disinterest is masked from detection by the lidar detector using the phase-only spatial light modulator and the second laser, the second laser including the continuous wave second laser or the pulsed second laser.

Another method embodiment of the invention is described as follows with reference to FIGS. 4-6. This method embodiment includes illustrative internal computational processing to go from lidar detector 30 to the computer 100 to the SLM 20. From the lidar detector 30, the data is collected is unique time/range bins. Optionally, depending on the user's application, multiple range bins are combined together. For example, if an object of interest in the scene has a depth of multiple range bins, then the multiple range bins covering the depth of the object would need to be combined to illuminate the entire object. Such a combination of multiple range bins allows the effective generation of a three-dimensional image, or a two-dimensional image with clarity owing to knowledge of the object's depth. Once the appropriate range bin(s) is selected, the intensity data is mapped as a two-dimensional array. At this stage, the image is thresholded above some minimum value to create a binary mask, identifying targets within the specific bin lot example, the minimum value is the noise floor of the lidar detector. As another example, the minimum value is the value required to include high reflectivity points in the scene. Alternatively, an inverse mask, identifying the voids (non-targets) within the specific range bin, is calculated. For example, the minimum value is the noise floor of the lidar detector. As another example, the minimum value is the value required to exclude high reflectivity points in the scene. Depending on the application, preference for re-illumination may be to targets or void areas.

Once the area of illumination is selected, the appropriate pattern is computed to impose on the SLM 20. First, the binary mask is multiplied, by a Gaussian-distributed random number phase array. The complex data is then Fourier-transformed. For a phase-only spatial light modulator, the magnitude data is ignored, and the 2-pi wrapped phase, $\theta$, is encoded on the spatial light modulator. For an intensity-only spatial light modulator, an intensity hologram such as $H=|1+\exp(i\times\theta)|^2$ may be encoded on the spatial light modulator.

Variations to the processing formation of the shaped illumination beam include (but are not limited to): Gaussian or Uniform white noise added to the binary mask, phase, or both amplitude and phase. Other standard noise functions with different statistics are optionally utilized as well, but may impact the recovered illumination distribution.

The above-described internal computational processing provides a non-iterative approach to lidar illumination. An approximate, non-iterative approach is valuable with respect to real-time operation. When system operation includes a moving target and/or moving platform, the ability to track and/or illuminate the scene with high accuracy is highly dependent on the processing speed of the overall system. This above-described internal computational processing addresses this issue in only a few steps.

An added feature of an embodiment of the invention is the ability to not only shape illumination to objects within the scene, but also the ability to shape the illumination beam to the inverse pattern. In many applications, inverse illumination may be more important to the scene analysis, interpretability and image recovery. In some cases, bright first returns from certain objects dominate the scene; inverse masking provides a means to investigate areas of initial low signal return.

Portions of the invention operate in a standard computing operating environment 100, for example, a desktop computer, a laptop computer, a mobile computer, a server computer, and the like, in which embodiments of the invention may be practiced. While the invention is described in the general context of program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multi-processor systems, microprocessor-based or programmable consumer electronics, minicomputers, mainframe computers, autonomous embedded computers, and the like. The invention may also be practiced in distributed computing environments where tasks are performed by remote processing devices that are linked through a communications network. In a distributed computing environment, program modules may be located in both local and remote memory storage devices.

An illustrative operating environment for embodiments of the invention will be described. A computer comprises a general purpose desktop, laptop, handheld, mobile or other type of computer (computing device) capable of executing one or more application programs. The computer includes at least one central processing unit ("CPU"), a system memory, including a random access memory ("RAM") and a read-only memory ("ROM"), and a system bus that couples the memory to the CPU. A basic input/output system containing the basic routines that help to transfer information between elements within the computer, such as during startup, is stored in the ROM. The computer further includes a mass storage device for storing an operating system, application programs, and other program modules.

The mass storage device is connected to the CPU through a mass storage controller (not shown) connected to the bus. The mass storage device and its associated computer-readable media provide non-volatile storage for the computer. Although the description of computer-readable media contained herein refers to a mass storage device, such as a hard disk or CD-ROM drive, it should be appreciated by those skilled in the art that computer-readable media can be any available media that can be accessed or utilized by the computer.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other tangible non-transitory medium which can be used to store the desired information and which can be accessed by the computer.

According to various embodiments of the invention, the computer may operate in a networked environment using logical connections to remote computers through a network, such as a local network, the Internet, etc, for example. The computer may connect to the network through a network interface unit connected to the bus. It should be appreciated that the network interface unit may also be utilized to connect to other types of networks and remote computing systems.

The computer may also include an input/output controller for receiving and processing input front a number of other devices, including a keyboard, mouse, etc., Similarly, an input/output controller may provide output to a display screen, a printer, or other type of output device.

As mentioned briefly above, a number of program modules and data files may be stored in the mass storage device and RAM of the computer, including an operating system suitable for controlling the operation of a networked personal computer. The mass storage device and RAM may also store one or more program modules. In particular, the mass storage device and the RAM may store application programs, such as a software application, for example, a word processing application, a spreadsheet application, a slide presentation application, a database application, etc.

It should be appreciated that various embodiments of the present invention may be implemented as a sequence of computer-implemented acts or program modules running on a computing system and/or as interconnected machine logic circuits or circuit modules within the computing system. The implementation is a matter of choice dependent on the performance requirements of the computing system implementing the invention. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as described herein.

Although a particular feature of the disclosure may have been illustrated and/or described with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary kill in the art may effect alterations, modifications and variations to the examples without departing from the scope of the invention.

These and other implementations are within the scope of the following claims.

What is claimed as new and desired to be protected by Letters Patent of the United States is:

1. An apparatus comprising:
 a spatial light modulator transmitting a structured laser beam to an object of interest in a three-dimensional scene in a field of view;
 a lidar detector receiving a reflected laser beam reflected from the three-dimensional scene, the reflected laser beam denoting different round trip times of object surface reflections, said spatial light modulator being encoded using the reflected laser beam such that the structured laser beam one of masks and inverse masks the object of interest;
 a first laser transmitting a pulsed first laser beam to said spatial light modulator, said pulsed laser beam comprising a pulsed laser beam size, said spatial light modulator comprising a spatial light modulator size;
 a first optical element operably located between said pulsed laser and said spatial light modulator, said first optical element expanding said pulsed first laser beam size to said spatial light modulator size; and a second optical element operably located between said spatial light modulator and said at least one image plane, said structured laser beam comprising a structured laser beam size, said field of view comprising a field of view size, said second optical element expanding said structured laser beam size to said field of view size.

2. The apparatus according to claim 1, wherein said at least one image plane comprises a plurality of image planes, said plurality of image planes comprising respective distances from said lidar detector.

3. The apparatus according to claim 1, wherein said spatial light modulator comprises one of an intensity spatial light modulator, a complex transmittance spatial light modulator, and a phase-only spatial light modulator.

4. The apparatus according to claim 3, wherein said intensity spatial light modulator comprises an intensity hologram, said intensity hologram comprising one of a first encoded magnitude array and a second encoded magnitude array, said first encoded magnitude array being derived from a threshold-image mask and said second encoded magnitude array being derived from an inverse threshold-image mask.

5. The apparatus according to claim 3, wherein said complex transmittance spatial light modulator comprises a complex field with magnitude and phase, said complex field with magnitude and phase comprising one of a first encoded magnitude and phase array and a second encoded magnitude and phase array, said first encoded magnitude and phase array being derived from a threshold-image mask and said second encoded magnitude and phase array being derived from an inverse threshold-image mask.

6. The apparatus according to claim 5, wherein said complex transmittance spatial light modulator comprises one of an intensity hologram and a wrapped phase.

7. The apparatus according to claim 3, wherein said phase-only spatial light modulator comprises a wrapped phase, said wrapped phase comprises one of a first encoded phase array and a second encoded phase array, said first encoded phase array being derived from a threshold-image mask and said second encoded phase array being derived from a threshold-image inverse mask.

8. The apparatus according to claim 1, further comprising:
a second laser transmitting one of an illuminating continuous wave laser beam and an illuminating pulsed laser beam to said spatial light modulator.

9. The apparatus according to claim 8, further comprising:
one of a beam splitter and a flip-in mirror located optically between said second laser and said spatial light modulator.

10. A method comprising:
transmitting a structured pulsed laser beam from a spatial light modulator to an object of interest in a three-dimensional scene in a field of view; and
detecting a reflected laser beam from the three-dimensional scene in the field of view using a lidar detector, the reflected laser beam denoting different round trip times of object surface reflections, the spatial light modulator being encoded using the reflected laser beam such that the structured laser beam one of masks and inverse masks the object of interest,
wherein mid detecting a reflected laser beam from the field of view using a lidar detector comprises detecting at least one of range, position, and time data for one of at least one object of interest and at least one object of disinterest.

11. The method according to claim 10, further comprising:
extracting at least one range bin comprising the at least one image plane with the detected at least one of range, position, and time data for the one of at least one object of interest and the at least one object of disinterest.

12. The method according to claim 11, further comprising:
generating a threshold image from said at least one range bin; and
generating one of a threshold-image mask and a threshold-image inverse mask from the threshold image.

13. The method according to claim 12, further comprising one of:
generating a first encoded magnitude array from the threshold-image mask; and
generating a second encoded magnitude array from the threshold-image inverse mask.

14. The method according to claim 13, wherein the spatial light modulator comprises an intensity spatial light modulator, the intensity spatial light modulator comprising an intensity hologram, the method further comprising one of:
encoding the first encoded magnitude array onto the intensity spatial light modulator, the intensity hologram comprising the first encoded magnitude array; and
encoding the second encoded magnitude array onto the intensity spatial light modulator, the intensity hologram comprising the second encoded magnitude array.

15. The method according to claim 12, further comprising one of:
generating a first encoded magnitude and phase array from the threshold-image mask; and
generating a second encoded magnitude and phase array from the threshold-image inverse mask.

16. The method according to claim 12, further comprising one of:
generating a first encoded phase array from the threshold-image mask; and
generating a second encoded phase array from the threshold-image inverse mask.

17. A method comprising:
transmitting a structured pulsed laser beam using a spatial light modulator from a pupil plane to at least one image plane in a field of view;
detecting a reflected laser beam from the field of view using a lidar detector, wherein said detecting a reflected laser beam from the field of view using a lidar detector comprises detecting at least one of range, position, and time data for one of at least one object of interest and at least one object of disinterest;
extracting at least one range bin comprising the at least one image plane with the detected at least one of range, position, and time data for the one of at least one object of interest and the at least one object of disinterest;
generating a threshold image from said at least one range bin;
generating one of a threshold-image mask and a threshold-image inverse mask from the threshold image;
one of: generating a first encoded magnitude array from the threshold-image mask; and generating a second encoded magnitude array from the threshold-image inverse mask, wherein the spatial light modulator comprises an intensity spatial light modulator, the intensity spatial light modulator comprising an intensity hologram;
one of: encoding the first encoded magnitude array onto the intensity spatial light modulator, the intensity hologram comprising the first encoded magnitude array; and encoding the second encoded magnitude array onto the intensity spatial light modulator, the intensity hologram comprising the second encoded magnitude array;

one of: illuminating at least one object of interest for detection by the lidar detector using the intensity spatial light modulator and a second laser, the second laser comprising one of a continuous wave second laser and a pulsed second laser; and masking at least one object of disinterest from detection by the lidar detector using the intensity spatial light modulator and the second laser, the second laser comprising one of the continuous wave second laser and the pulsed second laser.

18. A method comprising:

transmitting a structured pulsed laser beam using a spatial light modulator from a pupil plane to at least one image plane in a field of view;

detecting a reflected laser beam from the field of view using a lidar detector, wherein said detecting a reflected laser beam from the field of view using a lidar detector comprises detecting at least one of range, position, and time data for one of at least one object of interest and at least one object of disinterest;

extracting at least one range bin comprising the at least one image plane with the detected at least one of range, position, and time data for the one of at least one object of interest and the at least one object of disinterest;

generating a threshold image from said at least one range bin;

generating one of a threshold-image mask and a threshold-image inverse mask from the threshold image;

one of: generating a first encoded magnitude and phase array from the threshold-image mask; and generating a second encoded magnitude and phase array from the threshold-image inverse mask, wherein the spatial light modulator comprises a complex transmittance spatial light modulator, the complex transmittance spatial light modulator comprising a complex field with magnitude and phase;

one of: encoding the first encoded magnitude and phase array onto the complex transmittance spatial light modulator, the complex field with magnitude and phase comprising the first encoded magnitude and phase array; and encoding the second encoded magnitude and phase array onto the complex transmittance spatial light modulator, the complex field with magnitude and phase comprising the second encoded magnitude and phase array.

19. The method according to claim 18, further comprising one of:

illuminating at least one object of interest for detection by the lidar detector using the complex transmittance spatial light modulator and a second laser, the second laser comprising one of a continuous wave second laser and a pulsed second laser; and masking at least one object of disinterest from detection by the lidar detector using the complex transmittance spatial light modulator and the second laser, the second laser comprising one of the continuous wave second laser and the pulsed second laser.

20. A method comprising:

transmitting a structured pulsed laser beam using a spatial light modulator from a pupil plane to at least one image plane in a field of view;

detecting a reflected laser beam from the field of view using a lidar detector, wherein said detecting a reflected laser beam from the field of view using a lidar detector comprises detecting at least one of range, position, and time data for one of at least one object of interest and at least one object of disinterest;

extracting at least one range bin comprising the at least one image plane with the detected at least one of range, position, and time data for the one of at least one object of interest and the at least one object of disinterest;

generating a threshold image from said at least one range bin; and generating one of a threshold-image mask and a threshold-image inverse mask from the threshold image;

one of: generating a first encoded phase array from the threshold-image mask; and generating a second encoded phase array from the threshold-image inverse mask, wherein the spatial light modulator comprises a phase-only spatial light modulator, the phase-only spatial light modulator comprising a wrapped phase;

one of: encoding the first encoded phase array onto the phase-only spatial light modulator, the wrapped phase comprising the first encoded phase array, and encoding the second encoded phase array onto the phase-only spatial light modulator, the wrapped phase comprising the second encoded phase array.

21. The method according to claim 20, further comprising one of:

illuminating at least one object of interest for detection by the lidar detector using the phase-only spatial light modulator and a second laser, the second laser comprising one of a continuous wave second laser and a pulsed second laser; and masking at least one object of disinterest from detection by the lidar detector using the phase-only spatial light modulator and the second laser, the second laser comprising one of the continuous wave second laser and the pulsed second laser.

* * * * *